United States Patent
Lim et al.

(10) Patent No.: US 9,965,014 B2
(45) Date of Patent: May 8, 2018

(54) TECHNIQUES FOR TRACING WAKELOCK USAGE

(71) Applicant: Intel Corporation, Santa Clara, CA (US)

(72) Inventors: Min Yeol Lim, Champaign, IL (US); Robert P Knight, Mahomet, IL (US); Gautam Upadhyaya, Champaign, IL (US); Neha Sharma, Urbana, IL (US)

(73) Assignee: INTEL CORPORATION, Santa Clara, CA (US)

( * ) Notice: Subject to any disclaimer, the term of this patent is extended or adjusted under 35 U.S.C. 154(b) by 192 days.

(21) Appl. No.: 14/129,920

(22) PCT Filed: Sep. 27, 2013

(86) PCT No.: PCT/US2013/062291
§ 371 (c)(1),
(2) Date: Dec. 27, 2013

(87) PCT Pub. No.: WO2015/047312
PCT Pub. Date: Apr. 2, 2015

(65) Prior Publication Data
US 2015/0095682 A1    Apr. 2, 2015

(51) Int. Cl.
*G06F 1/32* (2006.01)
(52) U.S. Cl.
CPC .......... *G06F 1/3206* (2013.01); *G06F 1/3203* (2013.01)
(58) Field of Classification Search
CPC .................................................. G06F 1/3203
See application file for complete search history.

(56) References Cited

U.S. PATENT DOCUMENTS

| 6,374,369 B1 * | 4/2002 | O'Donnell | G06F 11/3466 714/38.11 |
| 6,779,187 B1 * | 8/2004 | Hammond | G06F 9/44521 719/331 |
| 8,806,246 B1 * | 8/2014 | Wu | G06F 1/26 455/205 |

(Continued)

FOREIGN PATENT DOCUMENTS

KR    10-2012-0091551    8/2012

OTHER PUBLICATIONS

International Search Report and Written opinion for PCT Patent Application No. PCT/US2013/062291, dated Jun. 25, 2014, 10 pages.

(Continued)

*Primary Examiner* — Kim Huynh
*Assistant Examiner* — Eric Chang

(57) ABSTRACT

Various embodiments are generally directed to generating logs recording events related to wakelocks at application and kernel levels, and then temporally aligning graphs of those events in a visual presentation to enable debugging of wakelocks. An apparatus to debug wakelocks includes a processor component; a capture component to intercept calls associated with application level wakelocks, the intercepted calls received by an application power manager of an operating system from application routines; and a relaying component to cooperate with the application power manager to provide indications of the intercepted calls to a system log generator of the operating system coupled to the application power manager, the system log generator to generate system log data comprising indications of events associated with execution of the operating system by the processor component and the indications of the intercepted calls. Other embodiments are described and claimed.

16 Claims, 13 Drawing Sheets

(56) References Cited

U.S. PATENT DOCUMENTS

| | | | |
|---|---|---|---|
| 2004/0004617 A1* | 1/2004 | Street | G06F 11/321 |
| | | | 345/440 |
| 2010/0244571 A1* | 9/2010 | Spitaels | H02J 3/14 |
| | | | 307/80 |
| 2011/0235108 A1* | 9/2011 | Kato | G06F 3/1218 |
| | | | 358/1.15 |
| 2013/0042122 A1 | 2/2013 | Hackborn et al. | |
| 2013/0138987 A1 | 5/2013 | Wang | |

OTHER PUBLICATIONS

Vekris et al., "Towards Verifying Android Apps for the Absence of No-Sleep Energy Bugs", Proceedings of the 2012 USENIX conference on Power-Aware Computing and Systems, 2012, 5 pages.

Pathak et al., "What is keeping my phone awake? Characterizing and Detecting No-Sleep Energy Bugs in Smartphone Apps", Proceedings of the 10th International Conference on Mobile Systems, Applications and Services, 2012, 10 pages.

Pathak, A. et al., "What is keeping my phone awake? Characterizing and Detecting No-Sleep Energy Bugs in Smartphone Apps", MobiSys'12, Jun. 25-29, 2012, Low Wood Bay, Lake District, UK., 14 pages.

Zhang, J. et al., "A Comparison of Energy Bugs for Smartphone Platforms", International Workshop on the Engineering of Mobile-Enabled Systems, MOBS 2013, San Francisco, CA., 6 pages.

Extended European Search Report received for European Patent Application No. 13894236.2, dated Apr. 18, 2017, 10 pages.

Datta et al., "Android Power Management: Current and Future Trends", Enabling Technologies for Smartphone and Internet of Things (ETSIOT), Jun. 18, 2012.

\* cited by examiner

TECHNIQUES FOR TRACING WAKELOCK USAGE

TECHNICAL FIELD

Embodiments described herein generally relate to tracing the use of wakelocks to control the ability of a computing device to enter a lower power state.

BACKGROUND

It is commonplace for computing devices to incorporate power management features to support operating in various power states that each strike a different balance between consumption of electric power and availability of features to perform various tasks. In particular, portable computing devices tend to have rather sophisticated forms of power management in which the provision of the limited electric power available from a battery to various components is individually controllable.

For many of the uses to which a computing device may be put, it is often possible to allow a power management component to place the computing device in a lower power state. However, situations do arise in which it may be desired to maintain a computing device in a higher power state, and therefore, it may be desired to prevent a power management component from placing the computing device in a lower power state. By way of example, a computing device may be operated to perform playback of motion video, thereby requiring uninterrupted use of sufficient processing resources to decode motion video and uninterrupted use of a display to visually present the motion video. Further, such uninterrupted use of such resources may be required despite a limited supply of available electric power approaching depletion (e.g., despite a battery of the computing device running low).

It has therefore become commonplace to provide function calls to allow application routines and/or various portions of an operating system to request that a power management component of a computing device refrain from placing the computing device in a lower power state. This has become commonly referred to as requesting or "acquiring" a "wakelock" in which a computing device is "locked" into a higher power state or "kept awake" such that it cannot enter a lower power state or "sleep mode." Various implementations include support for calls to request a wakelock, calls to release a wakelock and/or calls to request a wakelock that is time limited such that it expires at the end of a specified period of time.

Unfortunately, the provision of such support for application routines to make use of wakelocks has been accompanied by the advent of so-called "no-sleep wakelock bugs" in which errors in application routines and/or other unexpected situations arise that result in excessive use of a wakelock, thereby leading to premature depletion of available electric power. These situations are sometimes referred to as "unexpected battery drain" and lead to debugging efforts to identify the manner in which a wakelock was somehow requested and granted, but never released.

Unfortunately, numerous portable computing devices incorporate operating systems that were not architected in a manner that facilitates quick detection of the source of such wakelock bugs. Various operating systems do support the generation of system log data that details the occurrence of various events over time. Also, various operating systems do support the ability to "dump" the current state of registers and various data structures to provide a detailed view of the state of components of the operating system, including whether there is a wakelock that was earlier requested, but which has not yet been released. However, no provision has been made to record or provide the data necessary to identify what routine or operating system component may have errantly requested a wakelock and/or neglected to release a wakelock.

DETAILED DESCRIPTION

Figure 1:
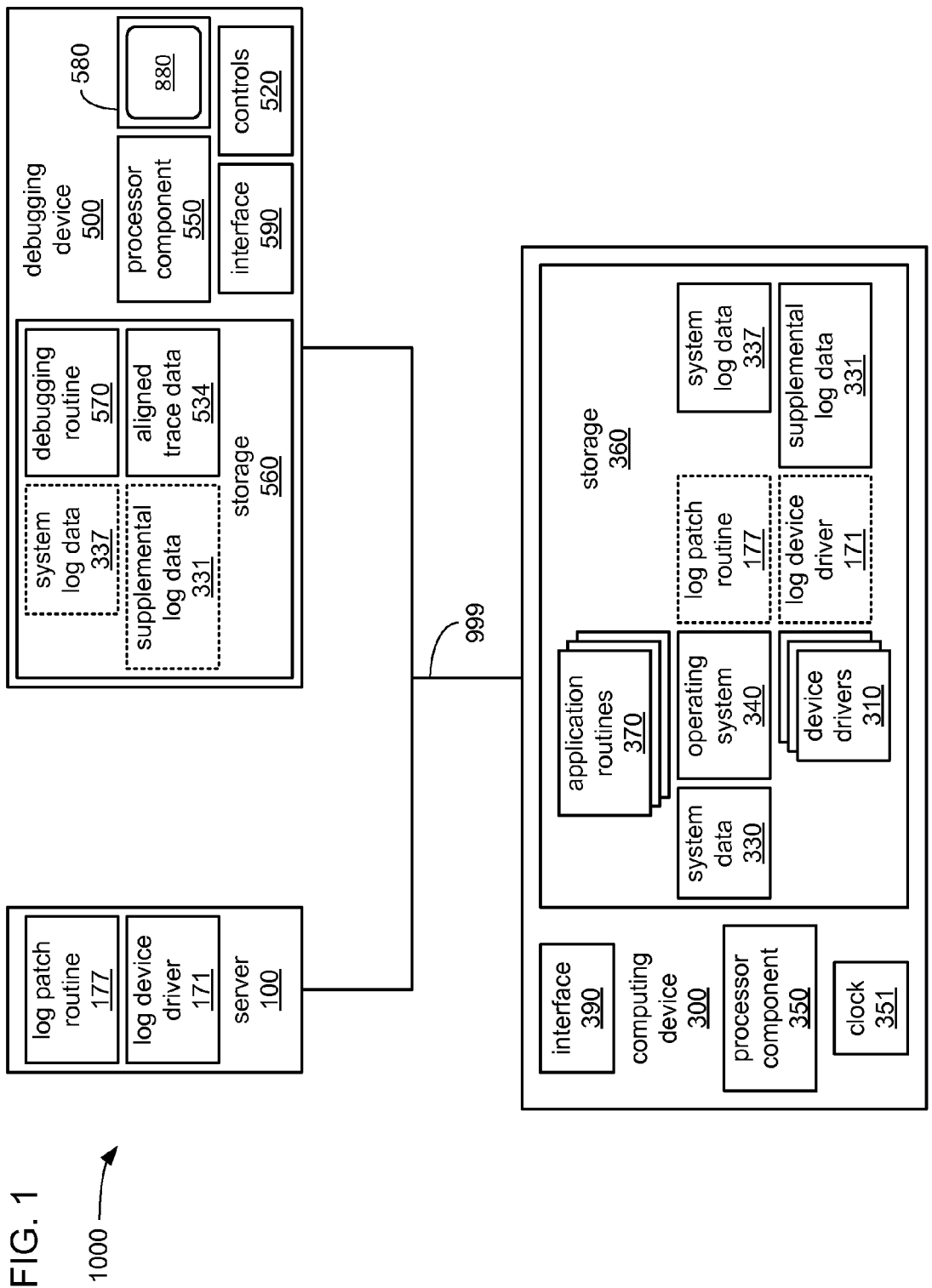
FIG. 1 illustrates an embodiment of a wakelock debugging system.

Various embodiments are generally directed to generating logs recording events related to wakelocks at application and kernel levels of an operating system, and then temporally aligning graphs of those events in a visual presentation to enable debugging of wakelocks. More specifically, an application power manager of an operating system is augmented with a log patch routine to enhance the recording of events in system log data normally generated by the operating system. Also, a log device driver is coupled to a kernel power manager of the operating system to generate supplementary log data recording kernel level wakelock events. Further, wakelock events and related events recorded in the system log data and the supplementary log data are visually presented in temporally aligned graphs to enable associations between events indicative of a wakelock bug to be viewed.

The operating system normally generates system log data in which occurrences of selected events are recorded in timestamped entries throughout execution of the operating system by a processor component of the computing device into which the operating system is incorporated. What events are among those selected to be recorded in the system log data is often made alterable by an operator of the computing device. More specifically, there is usually a "normal mode" in which a more limited selection of events are recorded and a "debug mode" in which a larger selection of events are recorded, and there is often an ability to dynamically switch between these modes under the control of an operator of such computing devices. However, even in a debug mode, there is usually little more than an indication of there being a wakelock still pending (e.g., an earlier requested wakelock that has not yet been released such that entry into a lower power state is prevented), and no indication of either which application routine(s) or how many application routines either requested and/or released a wakelock. What little information is typically recorded in the system log data is provided by the application power manager.

Within the operating system, power management may be handled at both the application level by an application power manager and the kernel level by a separate and distinct kernel power manager with which application power manager communicates. The application power manager receives calls from application routines either requesting or releasing wakelocks at the application level. The calls to request or release application level wakelocks received by the application power manager typically include identifying information indicating what application routine is transmitting the call. Further, in a multi-threaded processing environment, the application power manager is typically able to determine which thread each call is received from. The application power manager typically uses such information identifying application routines and/or threads to identify which previously requested wakelock at the application level is to be released when a call is received to release one of the application level wakelocks. However, the application power manager typically does not provide such information for recordation in the system log data. To remedy this lack of specificity in the system log data, the application power manager is augmented with a log patch routine. The log patch routine adds a sequence of instructions to the application power manager to cause the application power manager to provide information about each call to request or release an application level wakelock, along with information identifying what application routine and/or thread is associated with each of those calls.

The application power manager typically has no ability to directly control the current power state of a computing device (e.g., to place the computing device in any particular lower power or higher power state) on its own. Instead, the application power manager aggregates the calls it receives to request or release wakelocks at the application level into calls that it transmits to the kernel power manager to request or release a lesser quantity of wakelocks associated with the application power manager at the kernel level. These calls to the kernel power manager are typically devoid of information identifying applications and/or threads from which the original calls to request or release wakelocks at the application level originated. Often the only identifying information included in these calls from the application power manager to the kernel power manager is an indication of the application power manager as the source of the calls.

The kernel power manager receives calls requesting or releasing kernel level wakelocks from the application power manager, as well as from other components of the operating system and/or from device drivers at the kernel level. The kernel power manager is typically configured to provide no or very little information related to kernel level wakelocks or related events for recordation in the system log data. To remedy this utter lack of provision of information concerning events related to kernel level wakelocks, a log device driver is added to generate supplemental log data recording events related to the kernel level wakelocks, including occurrences of calls to request or release kernel level wakelocks and what operating system component makes each call (including the application power manager). The log device driver communicates with the kernel power manager to request that it be notified of all calls received by the kernel power manager to request or release kernel level wakelocks. The log device driver also timestamps the indications of each such event that it records in the supplemental log data.

Following generation of the system log data (with the enhanced information concerning application level wakelocks) and the supplemental log data, a debugging routine parses both to extract information concerning wakelock events and other related events. The debugging routine employs the timestamps associated with those events in each of the logs to temporally align them and visually present temporally aligned graphs of timelines of those events on a display to enable correlations between events leading to a wakelock bug to be identified. The debugging routine may be executed by a processor component of the same computing device on which the wakelock bug occurred and/or may be executed by a processor component of a separate debugging device.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a wakelock debugging system 1000 incorporating one or more of a server 100, a computing device 300 and a debugging device 500. Each of these computing devices 100, 300 and 500 may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, subsets of these computing devices 100, 300 and 500 may exchange signals associated with the debugging of wakelocks requested by one or more routines executed on the computing device 300 via a network 999. However, one or more of these computing devices may exchange other data entirely unrelated to such debugging with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 300 incorporates one or more of a processor component 350, a clock 351, a storage 360 and an interface 390 to couple the computing device 300 to the network 999. The storage 360 stores one or more of an operating system 340, device drivers 310, system data 330, application routines 340, a log patch routine 177, a log device driver 171, system log data 337 and supplemental log data 331. Each of the operating system 340, the device drivers 310, the application routines 370, the log patch routine 177 and the log device driver 171 incorporates a sequence of instructions operative on the processor component 350 in its role as a main processor component of the computing device 300 to implement logic to perform various functions.

In executing the operating system 340 and the device drivers 310, the processor component 350 provides various forms of support for also executing the application routines 370. More specifically, the processor component 350 makes available an application programming interface (API) that enables various function calls to be made during execution of the application routines 370 to provide an operating environment in which the application routines 370 may be executed to perform whatever functions for which the application routines 370 are configured. Each application routine 370 may be any of a variety of types of application-level routines selected for execution on the computing device 300 by the processor component 350 with the support of the operating system 340 to perform any of a variety of personal and/or professional purposes, including word processors, website viewers, photograph editors, meeting schedule management, CAD/CAM, etc. The processor component 350 is also caused to manage the consumption of electric power by the components of the computing device 300, and does so by transitioning the computing device 300 among various lower power and higher power states. As familiar to those skilled in the art, during at least some lower power states, the functionality of the computing device 300 may be reduced in various ways, including reducing clock speeds of and/or withdrawing electric power from various components of the computing device 300.

Among the callable functions provided by at least the operating system 340 to the application routines 370 are calls to request and release wakelocks. As previously discussed, the requesting of a wakelock is a request to the operating system 340 to refrain from transitioning the computing device 300 into at least some forms of lower power mode to enable one or more of the application routines 370 to continue to make use of a fuller level of functionality provided by the computing device 300. One or more of the application routines 370 may transmit a call to the operating system 340 to request a wakelock for any of a variety of reasons based at least partly on the functions performed by the application routines 370. By way of example, one of the application routines 370 may perform real-time monitoring of data received from another device via the network 999 such that a lower power mode characterized by a reduced clock speed of the processor component 350 or reduced functionality of the interface 390 may disable the ability of that application routine 370 to perform that function. By way of another example, one of the application routines 370 may perform decoding and playback of a motion video stored within the storage 360 such that a lower power mode characterized by withdrawing power from a display coupled to the computing device 300 or by reducing the clock speed of the processor component 350 may disrupt the ability of that application routine 370 to perform either function.

Figure 3:
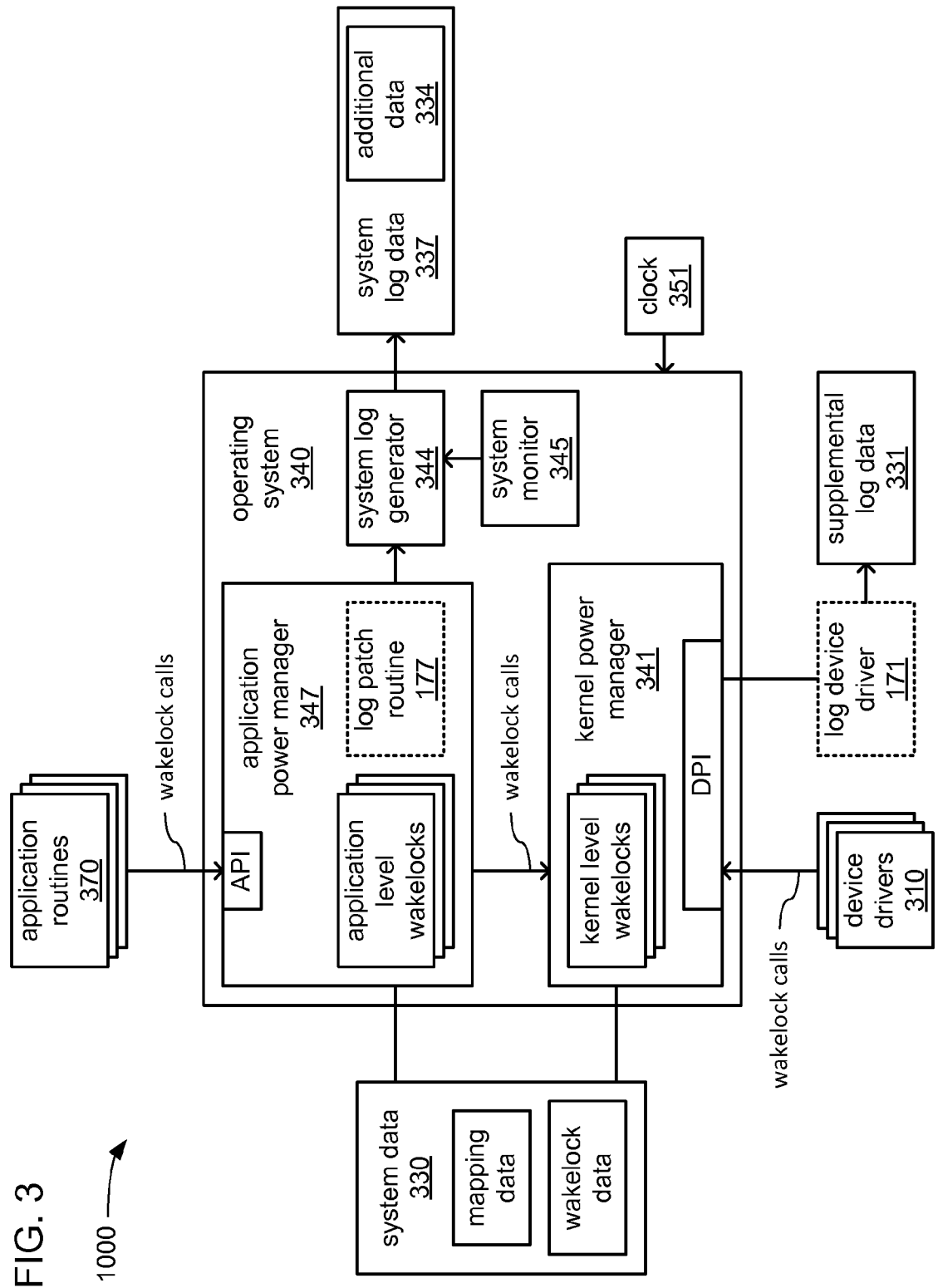
FIG. 3 illustrates an example of generating log data according to an embodiment.

FIG. 3 depicts an embodiment of operation of components of the computing device 300 to use and debug wakelocks. As depicted, the operating system 340 may incorporate both an application power manager 347 to manage application level wakelocks and a kernel power manager 341 to manage kernel level wakelocks, including a kernel level wakelock associated with the application power manager 347. The operating system 340 may also incorporate a system log generator 344 to generate the system log data 337, and may additionally incorporate a system monitor 345 to monitor various parameters of the operation of the computing device 300 for recordation in the system log data 337.

During normal execution of one of the application routines 370 where that one of the application routines 370 requires a wakelock, that one of the application routines 370 transmits a call requesting a wakelock to the application power manager 347. The call used is a function call of the API that is provided by the application power manager 347 for use by the application routines 370. The call includes identifying information that identifies the one of the application routines 370 that made the call as the routine that requested the wakelock and that is to be associated with that wakelock. The identifying information may include an identifier of the one of the application routines 370 provided directly by that application routine 370 as a parameter of the call and/or an identifier of a thread from which the call is received and on which a portion of that one of the application routines 370 is executed by the processor component 350. The operating system 340 may maintain mapping data within the system data 330 that correlates identifiers of threads from which calls may be received to particular ones of the application routines 370 (and other routines) that are executed on those threads. The system data 330 contains various pieces of data required for the normal operation of the operating system 340, and may be stored in a location within the storage 360 to which access is greatly restricted to prevent accidental or malicious alteration.

In response to receiving the request for a wakelock, the application power manager 347 instantiates an application level wakelock, and again, associates it with the one of the application routines 370 that requested it. In so doing, the application power manager 347 may create an entry in wakelock data maintained within the system data 330 that correlates the requested application wakelock to the one of the application routines 370 that requested it and that includes an indication that the application wakelock is currently pending. With the instantiation of an application level wakelock, an application level wakelock is then "active" or "pending," and the fact of there being even one wakelock pending prevents the computing device 300 from transitioning into a lower power state. For the computing device 300 to be allowed to transition to a lower power state, any and all wakelocks that are active or pending must first be released. Upon receipt of a subsequent call to release the wakelock associated with that one of the application routines 370, the identifying information of that subsequent call is used to identify which application wakelock to release, and the entry in the wakelock data may be cleared or marked with an indication of that wakelock no longer pending. Thus, the call to release a pending wakelock results in that wakelock no longer being active such that it no longer can prevent the computing device from transitioning into a lower power state, though there may be one or more other wakelocks still pending that may still prevent transitioning into a lower power state. As previously discussed, the application power manager 347 aggregates all pending application level wakelocks into a lesser quantity of kernel level wakelocks that it requests of the kernel power manager 341 whenever any application level wakelock is pending. Stated differently, as long as there is any pending application level wakelock, the application power manager communicates with the kernel power manager to cause a limited quantity of kernel level wakelocks associated with the application power manager 347 to also be pending. In some embodiments, there may be only one kernel level wakelock associated with the application power manager 347.

Thus, if a request for a wakelock is received by the application power manager 347 at a time when no application level wakelock is already pending, then the application power manager 347 signals the kernel power manager 341 with a request for a kernel level wakelock associated with the application power manager 347. Otherwise if a request for a wakelock is received by the application power manager 347 at a time when at least one application level wakelock is already pending, then the application power manager 347 may not again signal the kernel power manager 341 with a request for a kernel level wakelock associated with the application power manager 347, because a kernel level wakelock should already be pending. Only when there ceases to be any application wakelocks pending (e.g., all application level wakelocks that were pending have been released) does the application power manager 347 transmit a call to the kernel power manager 341 to release the kernel level wakelock associated with the application power manager 347.

The calls from the application power manager 347 to the kernel power manager 341 to request or release the kernel level wakelock associated with the application power manager 341 include identifying information that identifies the application power manager 341 as the source of the call. This same call mechanism may also be used by other kernel level components of the operating system 340 and/or by the device drivers 310 to directly request kernel level wakelocks or release them. Not unlike the calls related to wakelocks received by the application power manager 347, the identifying information in at least some of the calls related to wakelocks received by the kernel power manager 341 may include an identifier provided by whatever transmits the call as a parameter of the call and/or an identifier of a thread or operating system process from which the call is received. The mapping information of the system data 330 may be employed by the kernel power manager 341 to correlate identifiers of threads or operating system processes to the application power manager 347, a kernel level component of the operating system 340 or one of the device drivers 310. However, in some embodiments, the only one of such calls providing such information may be the calls from the application power manager 347, and those may only identify the application power manager 347 as the source of the calls. The kernel power manager 341 may also make and clear entries in the wakelock data of the system data 330 as a mechanism to track which kernel level wakelocks are currently pending and their association with whatever operating system component or device driver 310 requested them. As previously discussed, the kernel power manager 341 may be the portion of the operating system 340 that acts on at least the presence or absence of pending wakelocks by transitioning the computing device 300 among various lower and/or higher power states.

It should be noted that the calls used to at least request wakelocks may incorporate one or more indicator flags as parameters to indicate specific characteristics desired in the wakelocks requested. By way of example, a call to request a wakelock may specify that the wakelock is limited to locking a particular resource or component of the computing device 300 (e.g., a display, a particular storage media device, etc.) against being placed into a lower power state. It should also be noted that various debug flags or messages may be incorporated into calls related to wakelocks to provide some indication of a status of a portion of an application routine and/or some indication of what portion of an application routine required a wakelock. Such incorporation of such debug flags or messages may be as parameters conveyed in such calls. It should be further noted that at least the kernel level wakelocks may be requested to be self-expiring wakelocks that automatically cease to be pending after a selected period of time has elapsed since being instantiated in response to being requested. Such a selected period of time may be specified as a parameter of the call to request the wakelock or may be a predetermined period of time (e.g., a default period of time that might be overridden by specifying a different period of time as a parameter).

During normal execution of the operating system 340, the system log generator 344 recurringly adds entries to the system log data 337 that record the occurrences of a selected set of events. Among that selected set may be occurrences of changes among power states of the computing device 300, occurrences of system errors, occurrences of improper accesses attempted to particular portions of the storage 360 (e.g., the portion in which the system data 330 is stored), etc. The system monitor 345 may monitor various aspects of the operation of the computing device 300 (e.g., its current power state) to supply the system log generator 344 with at least some of the information it records in the system log data 337. The system log generator 344 may also routinely communicate with the clock 351 to obtain the current time for use in timestamping the entries it adds to the system log data 337.

As previously discussed, the provision of support for wakelocks can be accompanied by wakelock bugs in which a wakelock is errantly maintained long enough to result in depletion of a limited source of electric power of the computing device 300, such as a battery (not specifically shown). As also previously discussed, the typical support for debugging wakelock bugs provided by operating systems is the inclusion only of indications of whether a wakelock is pending or not in the system log data, but no indication of which application routine, operating system component or device driver had a wakelock pending.

However, as depicted in FIG. 3, the application power manager 347 is augmented with the log patch routine 177 to overcome this lack of information in the system log data 337. In some embodiments, the log patch routine 177 may be linked (dynamically or statically) to the application power manager 347 (e.g., the log patch routine 177 may implement a library of callable functions that are substituted for those of another library) to couple them via a call mechanism. In other embodiments, the log patch routine 177 may be incorporated into the application power manager 347 prior to compiling (e.g., the sequences of instructions of both may be combined to effectively create a single combined routine via compiling) to more thoroughly couple them. Still other mechanisms of augmentation may occur to those skilled in the art.

The log patch routine 177 incorporates a sequence of instructions, that when added to those of the application power manager 347, provides additional application level wakelock information to the system log generator 344 for recordation as additional data 334 in the system log data 337. Specifically, the log patch routine 177 captures the calls received by the application power manager 347 from the application routines 370 to request or release wakelocks. The log patch routine 177 then cooperates with the application power manager 347 (e.g., uses the communications already in place between the application power manager 347 and the system log generator 344) to provide indications to the system log generator 344 of each of those calls to enable the system log generator 344 to record them as part of the additional data 334. These indications may include identifying information that identifies each of the ones of the application routines 370 that make those calls as indicated in the parameters included in those calls and/or as derived from referring to the mapping data maintained within the system data 330. Additionally, the application power manager 347 may be caused by execution of the log patch routine 177 by the processor component 350 to additionally provide indications to the system log generator 344 of each call made by the application power manager 347 to the kernel power manager 341 for recordation as part of the additional data 334. As with the other entries made in the system log data 337, the additional entries making up the additional data 334 are also timestamped.

Further, as also depicted in FIG. 3, the log device driver 171 is added to the set of device drivers 310 communicating with the kernel power manager 341 via a driver programming interface (DPI) at least partially provided by the kernel power manager 341 to support wakelock calls from device drivers (e.g., the device drivers 310). The DPI at least partly provided by the kernel power manager 341 may include support for a callback mechanism by which calls received by the kernel power manager 341 regarding at least wakelocks can be retransmitted to a device driver. The log device driver 171 incorporates a sequence of instructions, that when executed by the processor component 350, transmits a call to the kernel power manager 341 to request invocation of just such a mechanism such that each call received by the kernel power manager 341 to request or release a wakelock is relayed to the log device driver 171. In turn, the log device driver 171 analyzes the wakelock calls relayed to it to generate the supplemental log data 331 with entries indicating the occurrences of each of those calls. These indications may include identifying information that identifies each of the ones of the device drivers 310 that make those calls as indicated in the parameters included in those calls and/or as derivable from referring to the mapping data maintained within the system data 330. As with the entries made by the system log generator 344, the entries made in the supplemental log data 331 are timestamped by the log device driver 171. In so doing, the log device driver 171 may rely on the clock 351 to provide the current time just as the system log generator 344 does.

The augmenting of the system log data 337 with the entries of the additional data 334 and/or the generation of the supplemental log data 331 may be selectively triggered by the same mode setting that either enables or disables the "debug mode" that causes the inclusion of entries recording a larger set of events in the system log data 337. As previously discussed, support may be provided for switching into and out of the debug mode under the control of an operator of the computing device 300. Thus, the operating system 340 may be executed by the processor component 350 for some time before the functionality of the log patch routine 177 and/or the log device driver 171 is enabled such that one or more application level or kernel level wakelocks may already be in place. In some embodiments, the log patch routine 177, upon being enabled, may cause the application power manager 347 to provide an indication of all application level wakelocks already pending to the system log generator 344 for recordation as part of the additional data 334. Alternatively or additionally, the log device driver 171, upon being enabled, may request information of the kernel power manager concerning any kernel level wakelocks that are already pending, and may record such information in the supplemental log data 331. Further, at least the log patch routine 177 may cause the application power manager 347 to retrieve at least some of the mapping data of the system data 330 and provide it to the system log generator 344 for recordation as part of the additional data 334.

Returning to FIG. 1, the computing device 300 may receive the log patch routine 171 and the log device driver 177 from the server 100 via the network 999 and/or by another mechanism (e.g., through use of a removable storage medium). Alternatively, and though not specifically shown, the computing device 300 may receive the log patch routine 171 and the log device driver 177 from the debugging device 500, if present. Further, given that the log patch routine 171 may be compiled together with the application power manager 347 such that they may be integrated, the computing device 300 may receive the log patch routine 171 by receiving a version of the application power manager 347 with the log patch routine 171 integrated therein.

In various embodiments, the debugging device 500 (if present) incorporates one or more of a processor component 550, a storage 560, controls 520, a display 580 and an interface 590 to couple the debugging device 500 to the network 999. The storage 560 stores the system log data 337, the supplemental log data 331, aligned trace data 534 and a debugging routine 570. The debugging routine 570 incorporates a sequence of instructions operative on the processor component 550 in its role as a main processor component of the remote computing device 500 to implement logic to perform various functions.

In executing the debugging routine 570, the processor component 550 receives the system log data 337 and the supplemental log data 331 from the computing device 300 either via the network 999 or via another mechanism (e.g., through use of a removable storage medium). The processor component 550 parses each of the system log data 337 (including the additional data 334 therein) and the supplemental log data 331 to extract all indications of events or other information associated with wakelocks, as well as any mapping data. The processor component 550 may also extract information concerning levels or types of activity of various components of the computing device 300 (e.g., a level of utilization and/or clock speed of the processor component 350, a rate of flow of data through the interface 390, a rate of data retrieval from removable media of a storage device, etc.). The processor component 550 may employ any mapping data included in either the system log data 337 or the supplemental log data 331 to correlate identifying information in entries related to wakelocks to particular ones of the application routines 370 and/or components of the operating system 340. The processor component 550 then temporally correlates the entries conveying indications of these events by their timestamps and stores them as the aligned trace data 534.

The processor component 550 subsequently retrieves various combinations of the temporally aligned entries of the aligned trace data 534 and visually presents them as temporally aligned graphs of timelines of events occurring over a common period of time on the display 580. The processor component 550 may monitor the controls 520 to receive input from operation of the controls 520 by an operator of the debugging device 500 to select what combinations of the temporally aligned graphs are to be displayed and/or what period of time covered by the aligned trace data 534 is to be displayed.

Figure 4:
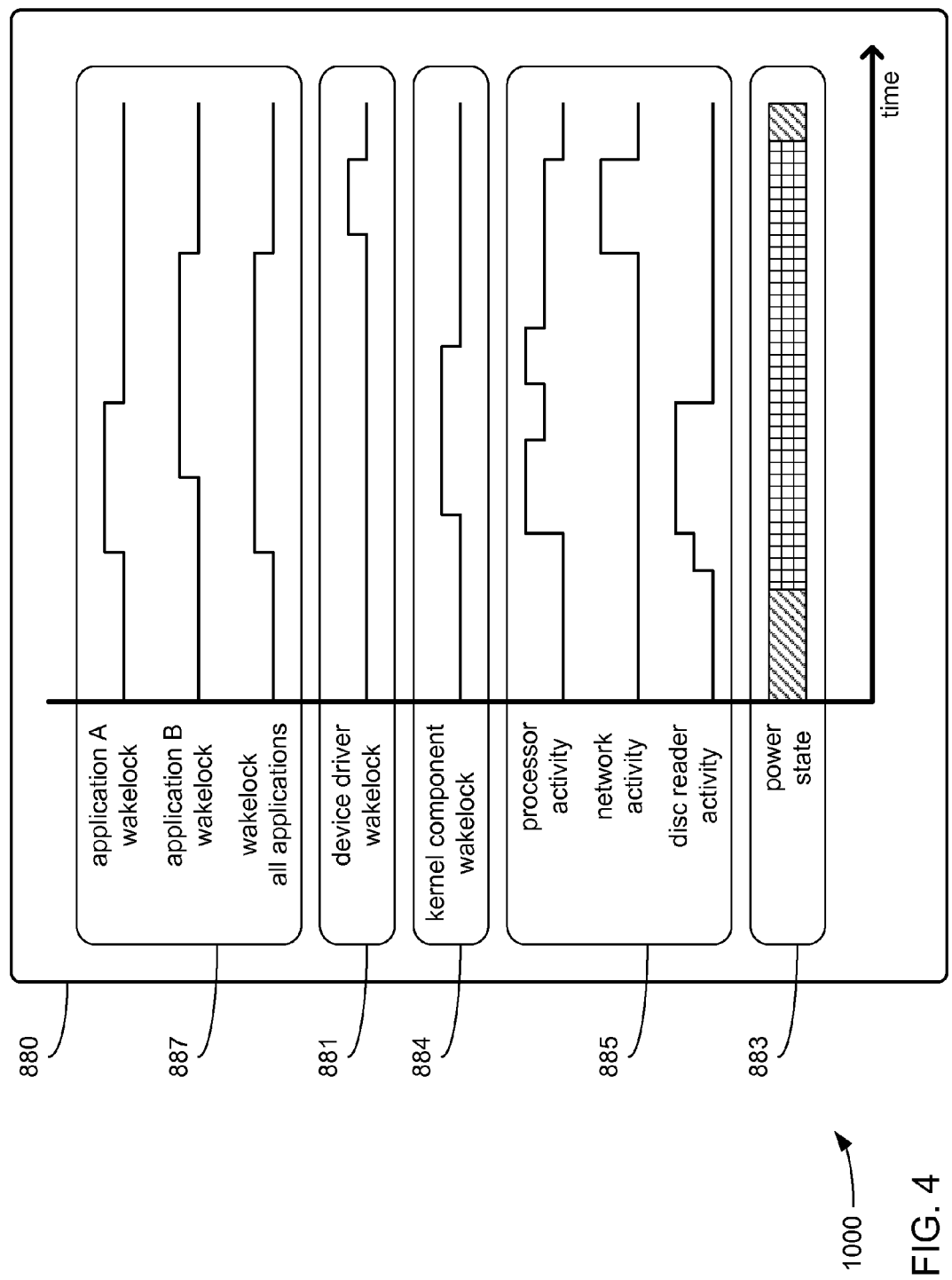
FIGS. 4-6 each illustrate an example image to facilitate debugging a wakelock according to an embodiment.
Figure 5:
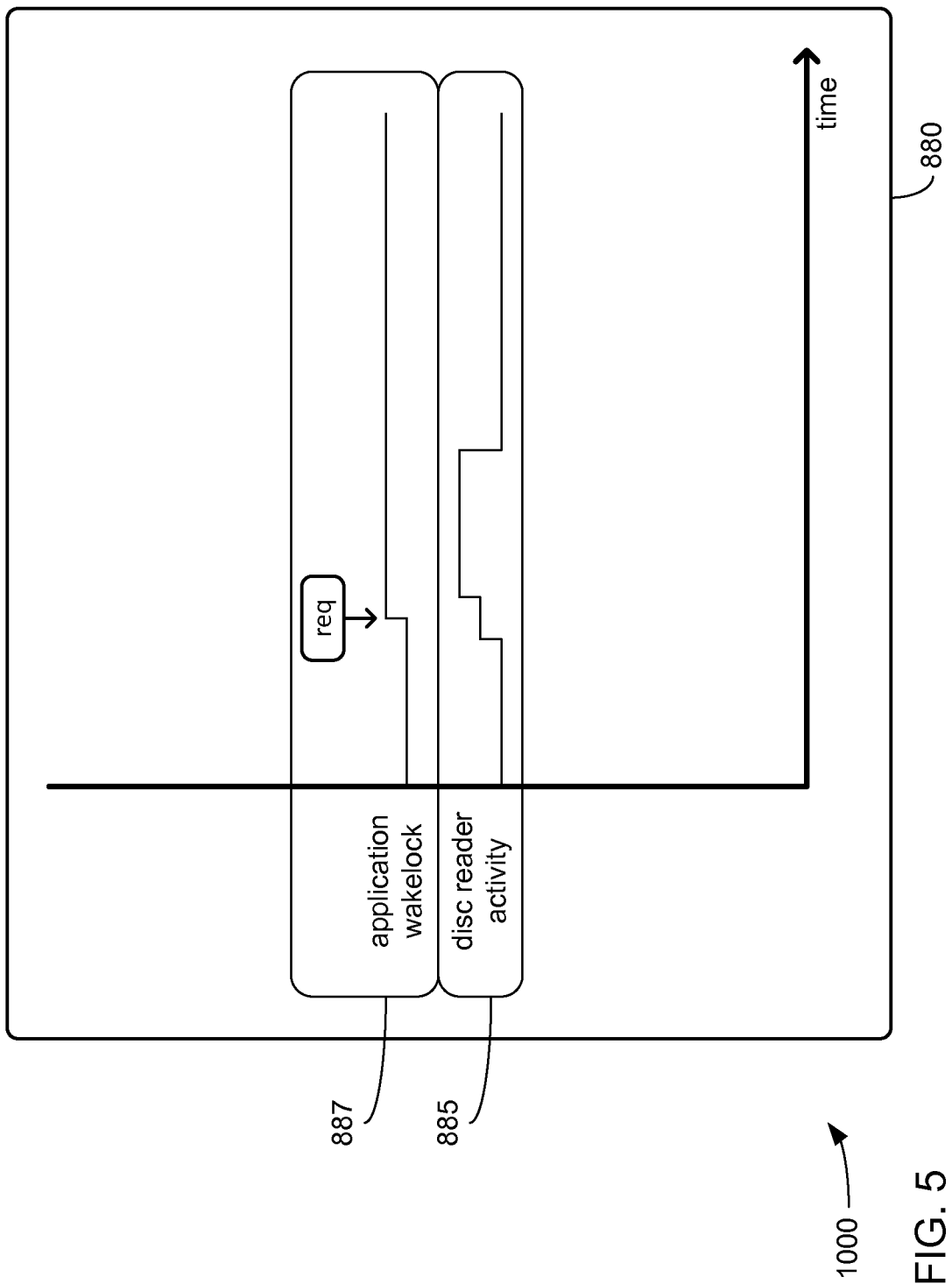
Figure 6:
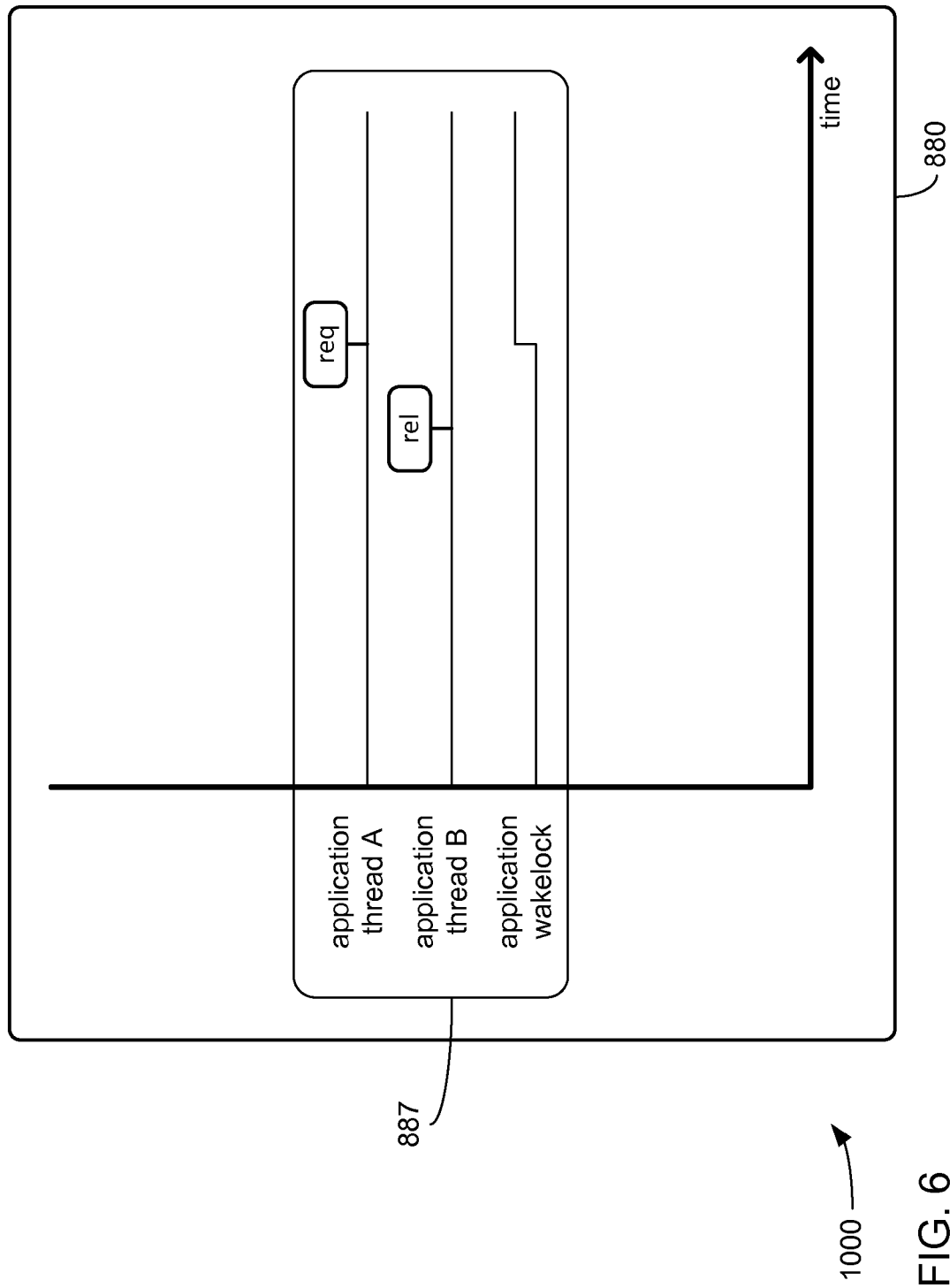

FIGS. 4, 5 and 6 each depict an example embodiment of an image 880 that may be visually presented on the display 580 of a combination of temporally aligned graphs of events associated with the use of wakelocks occurring over time during operation of the computing device 300. As depicted, and as will be explained, such temporal alignment aids in identifying possible cause-and-effect correlations between events associated with wakelocks, thereby aiding in debugging instances of wakelock bugs.

FIG. 4 depicts the visual presentation of multiple wakelock graphs 881, 884 and 887 that each present a timeline of events related to wakelocks such as the instantiation of a wakelock in response to a request for a wakelock and/or the release of a wakelock in response to a request to do so. Specifically depicted are three temporally aligned wakelock graphs 887 of the instantiation and release of three different wakelocks over a period of time, including two application level wakelocks that are each associated with a different application routine (e.g., one each of the application routines 370) and a kernel level wakelock associated with the application power manager 347. Also depicted is a wakelock graph 881 of the instantiation and release of a kernel level wakelock associated with a device driver (e.g., one of the device drivers 310) over the same period of time such that the wakelock graph 881 is temporally aligned with the three wakelock graphs 887. Further depicted is a wakelock graph 884 of the instantiation and release of a kernel level wakelock associated with a kernel level component of the operating system over the same period of time such that the wakelock graph 884 is temporally aligned with the wakelock graphs 887 and 881. Also further depicted are three activity graphs 885 of timelines of activity levels of the processor component 350, the interface 390 and a removable media storage device (e.g., a disc media reader, not specifically shown in any of the preceding figures) over the same period of time such that these activity graphs are temporally aligned with the aforementioned wakelock graphs. Still further depicted is a power state graph 883 of a timeline of transitions of the computing device 300 among power states over the same period of time such that the power state graph 883 is temporally aligned with the aforementioned wakelock graphs.

The temporal alignment of the three wakelock graphs 887 makes visible the cause-and-effect relationship of the instantiation and release of the two application level wakelocks bringing about the instantiation and release of a kernel level wakelock representing the aggregate of the two application level wakelocks associated with the application power manager 347. More specifically, it can be seen that while either of the two application level wakelocks are pending, the kernel level wakelock remains pending. Also, the temporal alignment of the wakelock graph 881 with the one of the activity graphs 885 for the interface 390 (e.g., the activity graph 885 of "network activity") provides a visual hint of the relationship that exists between the kernel level wakelock of the device driver with the activity of the interface 390. It should be noted that despite the depiction of activity of three specific components of the computing device 300, activity for other components and/or for more or fewer components may be included. Further, the components for which activity may be shown may be physically discrete components and/or functional blocks of circuitry of a single (or small number of) semiconductor devices (e.g., a "system-on-a-chip" or SOC). As can be seen, some amount of network activity commenced and then it was apparently determined by the device driver associated with the interface 390 that a wakelock was needed, causing the device driver to request one. Then, once the network activity ceased, that kernel level wakelock was released by the device driver. Further, the temporal alignment of the power state graph 883 with the wakelock graphs 881, 884 and 887 makes visible the cause-and-effect relationship between the pendency of wakelocks and power states of the computing device. Specifically, where there are no wakelocks pending, the computing device 300 is allowed to enter a lower power state (indicated in the power state graph 883 with diagonal cross-hatching), and where there is at least one wakelock pending, the computing device 300 is forced to remain in a higher power state (indicated in the power state graph 883 with square cross-hatching).

FIG. 5 depicts a simpler example of visual presentation of a single wakelock graph 887 of an application level wakelock associated with an application routine that is temporally aligned with a single activity graph 885 associated with a removable storage media device (e.g., the activity graph of a "disc reader"). The temporal alignment of these two graphs enables the cause-and-effect relationship to be seen between the commencement of activity on the part of the disc reader and the call marked on the wakelock graph 887 requesting a wakelock to allow the activity of the disc reader to continue without interruption from a possible transition to a lower power state. However, the temporal alignment of these two graphs also enables the lack of a call to release the wakelock once the activity of the disc reader ceased to be seen. As familiar to those skilled in the art, this may provide an indication of a "no sleep code bug" version of wakelock bug in which an error in a sequence of instructions results in a wakelock being requested, but never released. The sequence of instructions may lack the needed call to release the wakelock, or the logic of the sequence of instructions may be faulty in a manner that results in instructions to call for a release of the wakelock never being executed.

FIG. 6 depicts a simpler example of visual presentation of three temporally aligned wakelock graphs 887 of events associated with a single application level wakelock associated with an application routine (e.g., one of the application routines 370). Two of these wakelock graphs 887 visually depict the calls made by two separate threads associated with the same application routine to request a wakelock and to release it. The temporal alignment of these two wakelock graphs 887 make easily visible a possible "no sleep race condition" version of wakelock bug in which the timing of the execution of instructions between the two threads resulted in the call to request the wakelock occurring after the call to release it. The temporal alignment of these two wakelock graphs 887 with the third of these wakelock graphs 887 further depicts the cause-and-effect relationship of the order in which the two calls were made and the resulting instantiation of the requested wakelock and lack of subsequent release.

Figure 2:
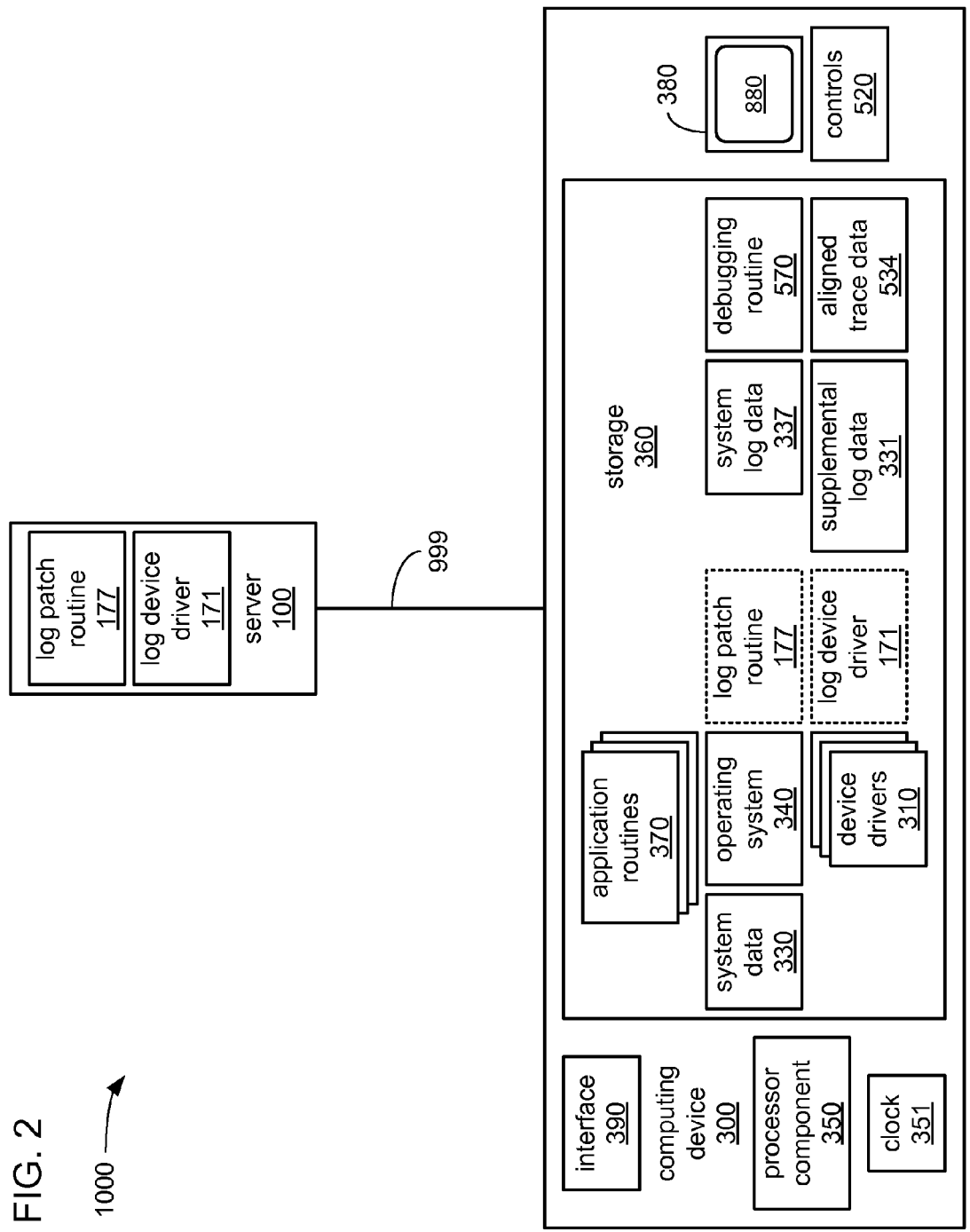
FIG. 2 illustrates an alternate embodiment of a wakelock debugging system.

FIG. 2 illustrates a block diagram of an alternate embodiment of the wakelock debugging system 1000 that includes an alternate embodiment of the computing device 300. The alternate embodiment of the wakelock debugging system 1000 of FIG. 2 is similar to the embodiment of FIG. 1 in many ways, and thus, like reference numerals are used to refer to like components throughout. However, unlike the computing device 300 of FIG. 1, the computing device 300 of FIG. 2 additionally incorporates features of the debugging device 500 of FIG. 1. Thus, it is the processor component 350 of the computing device 300 of FIG. 2 that parses, temporally aligns and visually presents temporally aligned timeline graphs of events associated with the use of wakelocks occurring over time in lieu of there being the separate and distinct debugging device 500 to do so. It is also a display 380 and controls 320 of the computing device 300 of FIG. 2 that are used in providing and controlling such a visual presentation in lieu of there being controls 520 and a display 580 of the separate and distinct debugging device 500 to do so.

In various embodiments, each of the processor components 350 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 360 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 390 and 590 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 7:
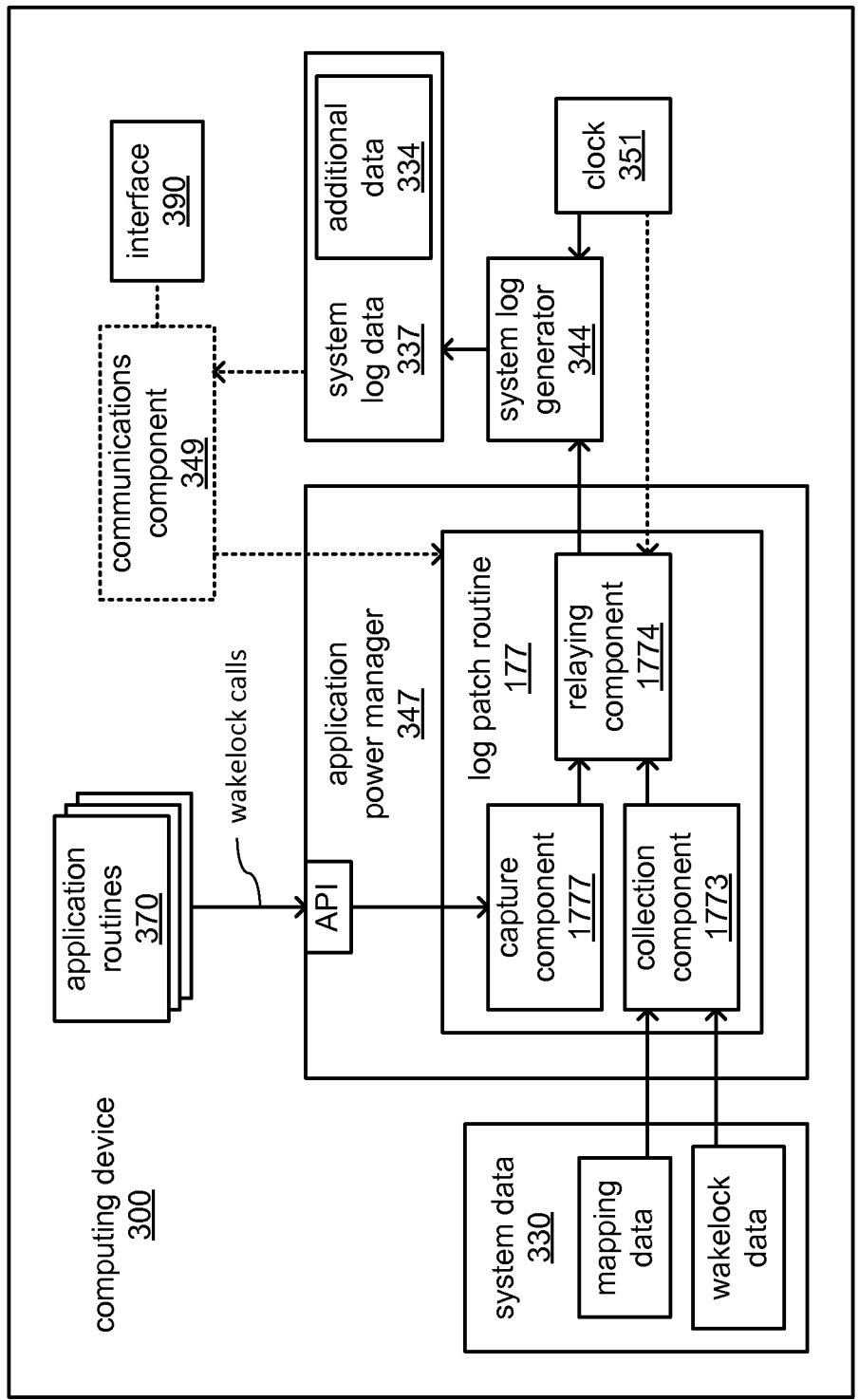
FIGS. 7-9 each illustrate a portion of an embodiment of a wakelock debugging system.
Figure 8:
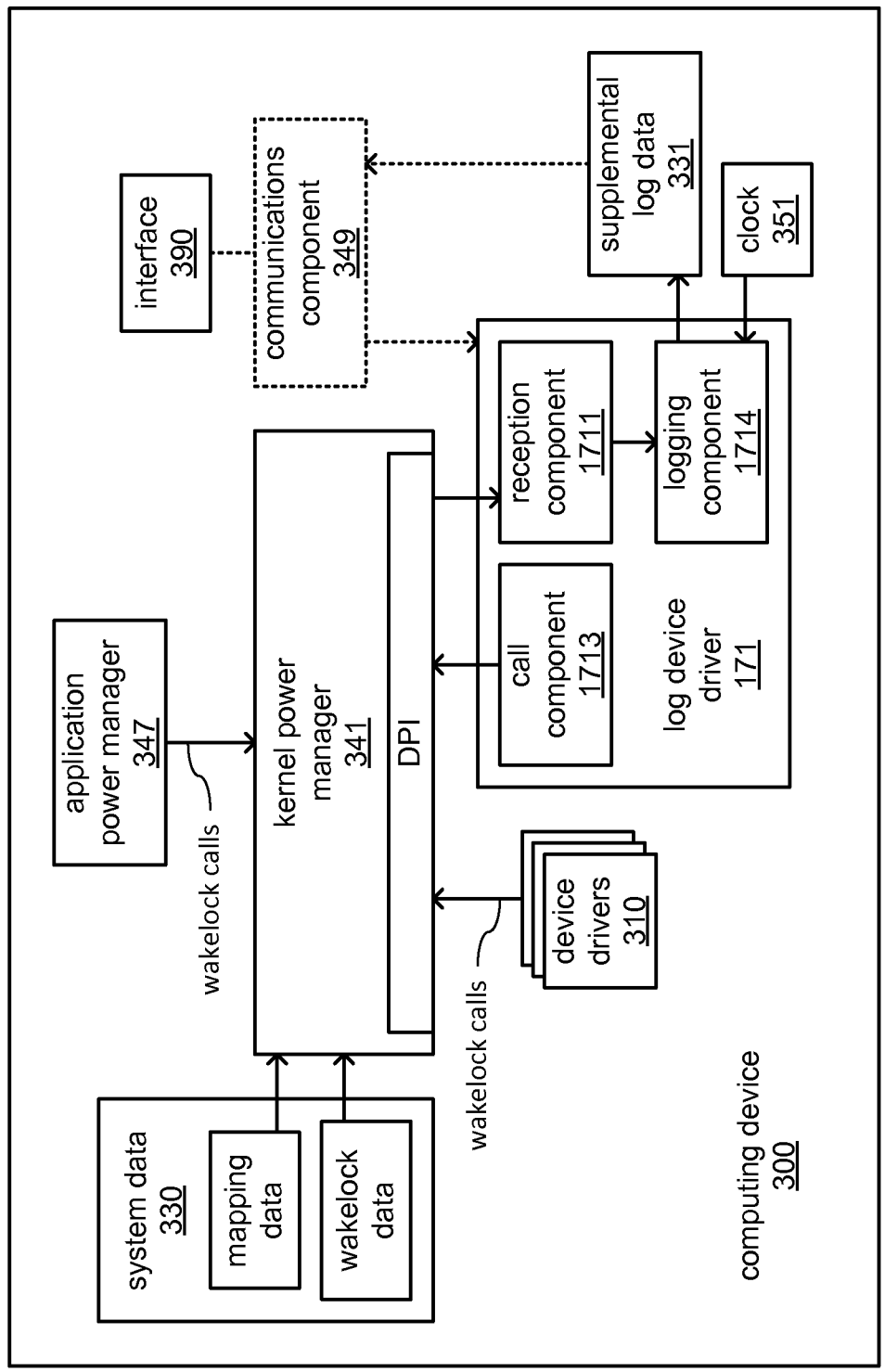
Figure 9:
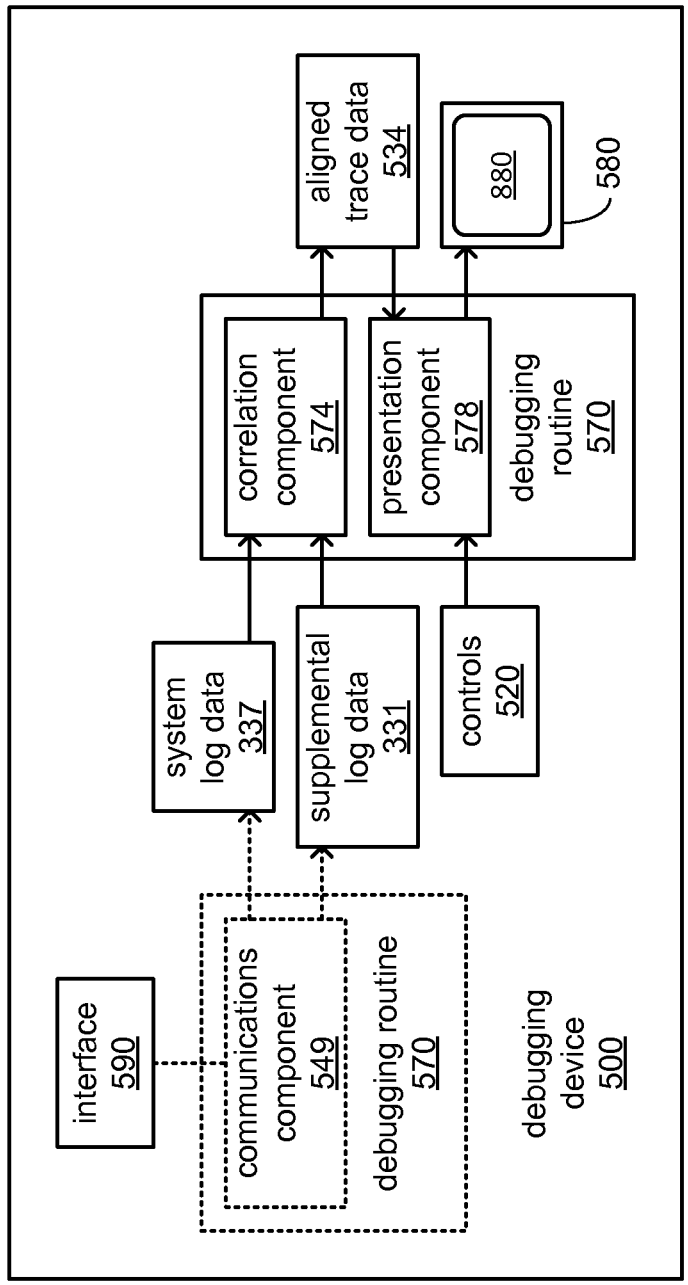

FIGS. 7, 8 and 9 each illustrate a block diagram of a portion of an embodiment of the heterogeneous core processing system 1000 of either FIG. 1 or FIG. 2 in greater detail. More specifically, FIG. 7 depicts aspects of the operating environment of the computing device 300 in which the processor component 350, in executing the operating system 340 and the log patch routine 177, records events associated with application level wakelocks in the system log data 337 with enhanced specificity. FIG. 8 depicts aspects of the operating environment of the computing device 300 in which the processor component 350, in executing the operating system 340 and the log device driver 171, records events associated with kernel level wakelocks in the supplemental log data 331. FIG. 9 depicts aspects of the operating environment of either the computing device 300 or the debugging device 500 in which processor component 350 or 550, respectively, in executing the debugging routine 570, employs the system log data 337 and the supplemental log data 334 to visually present temporally aligned timeline graphs of events to aid in debugging wakelocks.

As recognizable to those skilled in the art, the operating system 340, the log patch routine 177, the log device driver 171 and the debugging routine 570, including the components of which each is composed, are selected to be operative on whatever type of processor or processors that are selected to implement applicable ones of the processor components 350 or 550. In various embodiments, the sequences of instructions making up each may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 350 or 550. Where one or more device drivers are included, those device drivers may provide support for any of a variety of other components, whether hardware or software components, of corresponding ones of the computing devices 300 or 500.

Each of the operating system 340 and the debugging routine 540 may include a communications component 349 or 549 executable by the processor component 350 or 550 to operate the interface 390 or 590, respectively, to transmit and receive signals via the network 999 as has been described. Among the signals exchanged may be signals conveying the log patch routine 177 and/or the log device driver 171 from either the server 100 or the debugging device 500 to the computing device 300. Alternatively or additionally, among the signals exchanged may be signals conveying the system log data 337 and the supplemental log data 331 from the computing device 300 to the debugging device 500. As will be recognized by those skilled in the art, these communications components are selected to be operable with whatever type of interface technology is selected to implement corresponding ones of the interfaces 390 and 590.

Turning more specifically to FIG. 7, the log patch routine 177 may include a capture component 1777 executable by the processor component 350 to intercept incoming calls from the application routines 370 to request or release wakelocks. The capture component 1777 captures one or more of the parameters conveyed in those calls, including and not limited to, identifying information of whichever one of the application routines 370 transmitted the call, identifying information of whichever process of one of the application routine 370 transmitted the call, or one or more flags indicating one or more specific components of the computing device 300 to which a wakelock is to apply. Alternatively or additionally, the capture component 1777 may identify a thread on which the portion of the application routine 370 that transmitted the call is executed by the processor component 350.

The log patch routine 177 may include a collection component 1773 executable by the processor component 350 to cooperate with a portion of the application power manager 347 to retrieve mapping data and/or wakelock data of currently pending wakelocks from the system data 330. As previously discussed, the operating system 340 maintains various pieces of data required for its normal operation in the system data 330, and the system data 330 may be maintained in a portion of the storage 360 to which access is greatly restricted to prevent corruption of its contents. As previously explained, the mapping data correlates identifiers of processes to identifiers of threads on which those processes are executed (at least where the operating system 340 is executed in a multi-threaded environment) and to identifiers of ones of the application routines of which at least some of the processes are a part. As also previously explained, the wakelock data may include indications of at least pending application level wakelocks correlated to identifiers that associate each of the pending application level wakelocks to one of the application routines 370.

The log patch routine 177 may include a relaying component 1774 executable by the processor component 350 to provide indications of the receipt of calls to request or release application level wakelocks, mapping data and/or wakelock data of currently pending wakelocks to the system log generator 344 to be recorded as part of the additional data 334 in the system log data 337. Although in some embodiments the system log generator 344 may provide all timestamping of all entries that it creates in generating the system log data 337, the relaying component 1774 may alternatively or additionally receive indications of the current time more directly from the clock 351 to use in timestamping indications of events related to wakelocks that are conveyed to the system log generator 344.

Turning more specifically to FIG. 8, the log device driver 171 may include a call component 1713 executable by the processor component 350 to signal the kernel power manager 341 with a call requesting use of a callback mechanism of the DPI provided by the kernel power manager 341 to arrange for all calls to request or release kernel level wakelocks made to the kernel power manager 341 to be relayed to the log device driver 171. This would include calls for kernel level wakelocks made by one or more of the device drivers 310, the application power manager 347, and other components of the operating system 340. In some embodiments, the call component 1713 may also signal the kernel power manager 341 with a call requesting indications of what kernel level wakelocks are already pending, along with identifying information indicating which one(s) of the device driver 310 and/or which components of the operating system 340 requested them. This may result in the kernel power manager 341 retrieving at least a portion of the wakelock data maintained as part of the system data 330 that includes indications of pending kernel level wakelocks correlated to whatever device driver or operating system component is associated with them (e.g., whatever device driver or operating system component requested them).

The log device driver 171 may include a reception component 1711 executable by the processor component 350 to receive the indications from the kernel power manager 341 of calls that the kernel power manager 341 receives to request or release kernel level wakelocks. The provision of these indications by the kernel power manager 341 may be in response to the call made by the call component 1713 to the kernel power manager 341 to invoke a callback mechanism, as earlier discussed. The reception component 1711 may also capture indications received from the kernel power manager 341 of what kernel level wakelocks are currently pending and/or which ones of the device drivers 310 and/or which components of the operating system 340 requested them.

The log device driver 171 may include a logging component 1714 executable by the processor component 350 to generate the supplemental log data 331. In so doing, the logging component 1714 stores indications of calls to request or release kernel level wakelocks and/or wakelock data of currently pending wakelocks in the supplemental log data 331. The logging component 1714 receives indications of the current time from the clock 351 to use in timestamping indications of events related to kernel level wakelocks recorded in the supplemental log data 331, such as the calls to request or release kernel level wakelocks.

Turning more specifically to FIG. 9, the debugging routine 570 may include a correlating component 574 executable by either of the processor components 350 or 550 to parse the entries of the system log data 337 and the supplemental log data 331 to extract entries associated with wakelocks, as well as entries indicating aspects of activity of components of the computing device 300. The correlating component 574 temporally aligns the extracted entries and combines them to generate the aligned trace data 534. In so doing, the correlating component 574 may also extract any mapping data included in either of the system log data 337 or the supplemental log data 331 to correlate identifying information of routines, processes, threads, components of the operating system 340, etc., with application level and/or kernel level wakelocks to identify and use associations among them to further correlate entries in the aligned trace data 534.

The debugging routine 570 may include a presentation component 578 executable by either of the processor components 350 or 550 to visually present an image 880 on the display 380 or 580, respectively, of temporally aligned timeline graphs of events associated with wakelocks, activity of components of the computing device 300, and/or transitions between power states of the computing device 300 indicated in the aligned trace data 534. As has been discussed, the presentation component 578 may monitor the controls 320 or 520 to receive indications of operation of those controls by an operator of the computing device 300 or the debugging device 500, respectively, to select which ones of various events associated with wakelocks, activity levels of which components, etc. to have visually presented in the image 880. Alternatively or additionally, the controls 320 or 520 may be monitored to receive indications of operation to select a portion of the period of time covered by the aligned trace data 534 to be visually presented in the image 880.

Figure 10:
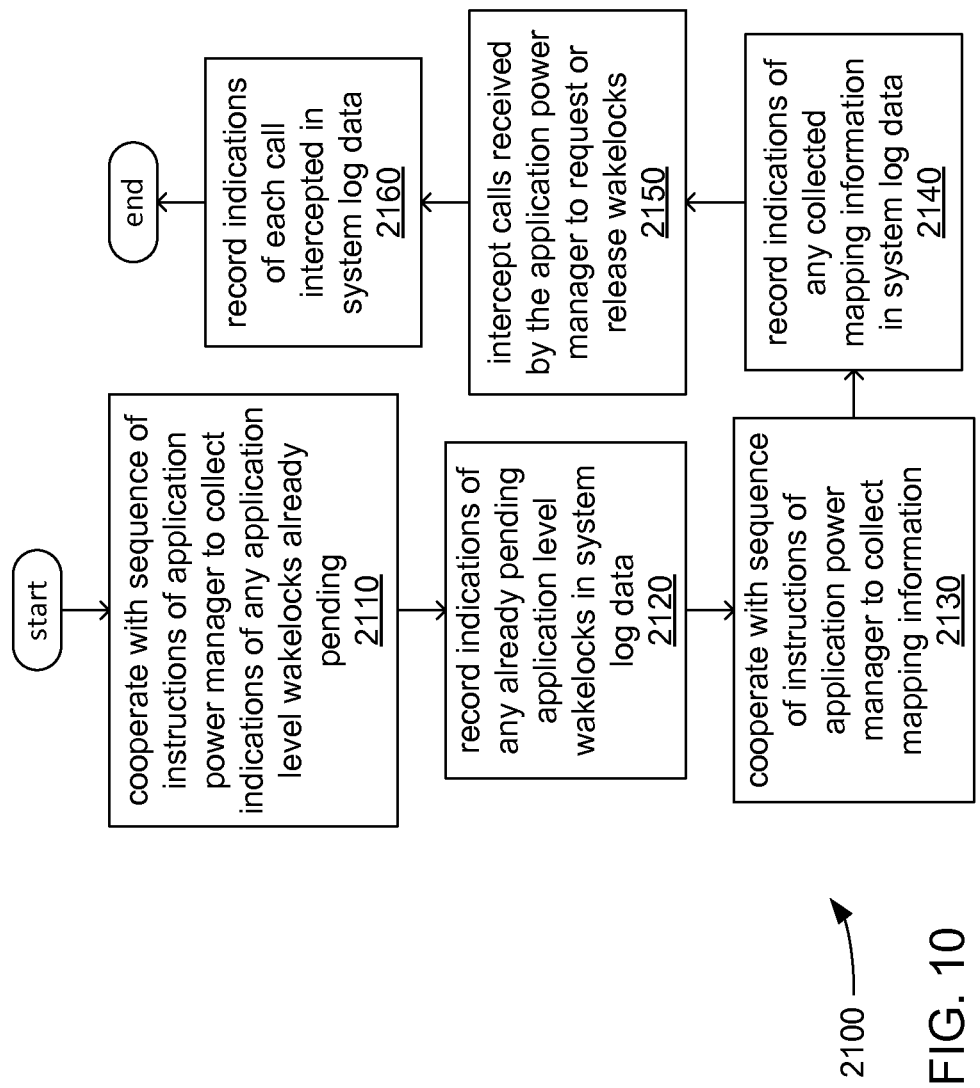
FIGS. 10-12 each illustrate a logic flow according to an embodiment.

FIG. 10 illustrates one embodiment of a logic flow 2100. The logic flow 2100 may be representative of some or all of the operations executed by one or more embodiments described herein. More specifically, the logic flow 2100 may illustrate operations performed by the processor component 350 in executing at least the operating system 340 and the log patch routine 177, and/or performed by other component(s) of the computing device 300.

At 2110, a processor component of a computing device of a wakelock debugging system (e.g., the processor component 350 of the computing device 300 of the wakelock debugging system 1000) executes a patch routine made up of a sequence of instructions to augment a sequence of instructions of an application power manager (e.g., the log patch routine 177 augmenting the application power manager 347 of the operating system 340). In so doing, cooperation is effected between the two sequences of instructions to collect indications of any application level wakelocks already pending at the time that the functionality of the patch routine is enabled. As has been discussed, this may entail the application power manager accessing a data structure maintained by the operating system (e.g., the wakelock data maintained as part of the system data 330) to retrieve entries of the data structure that correlate pending wakelocks to identifiers of whatever application routine is associated with them as a result of requesting them. Such entries of such a data structure may also maintain indications of which of those wakelocks are pending, or may include only entries for wakelocks that are pending.

At 2120, indications of any wakelocks already pending at the time the patch routine is enabled are recorded in system log data generated by a system log generator of the operating system (e.g., the system log generator 344 of the operating system 340). As previously discussed, the application power manager is already normally in communication with the system log generator to provide only a very limited indication of there being a wakelock pending, but without any indication of how many wakelocks are pending or which application routines they are associated with.

At 2130, further cooperation is caused between the patch routine and the application power manager to collect mapping information that maps application routines to processes and/or threads executed by the processor component. As has been discussed, this may entail the application power manager accessing another data structure maintained by the operating system (e.g., the mapping data maintained as part of the system data 330) to retrieve entries of the mapping data that provide the indications of such correlations. At 2140, indications of any mapping information collected are recorded in the system log data.

At 2150, calls received by the application power manager to request or release wakelocks are intercepted. As previously discussed, in intercepting such calls, the patch routine receives the parameters conveyed in those calls which may include identifying information associating the call with the application routine that requested it, one or more flags indicating particular components of the computing device to which the wakelock applies, and/or debug information that may be included as a parameter.

At 2160, still more cooperation is caused between the patch routine and the application power manager to employ the communication between the application power manager and the system data generator to provide the system data generator with indications of the intercepted calls. As previously discussed, this results in the system data generator creating entries in the system log data for those intercepted calls, including parameter information.

Figure 11:
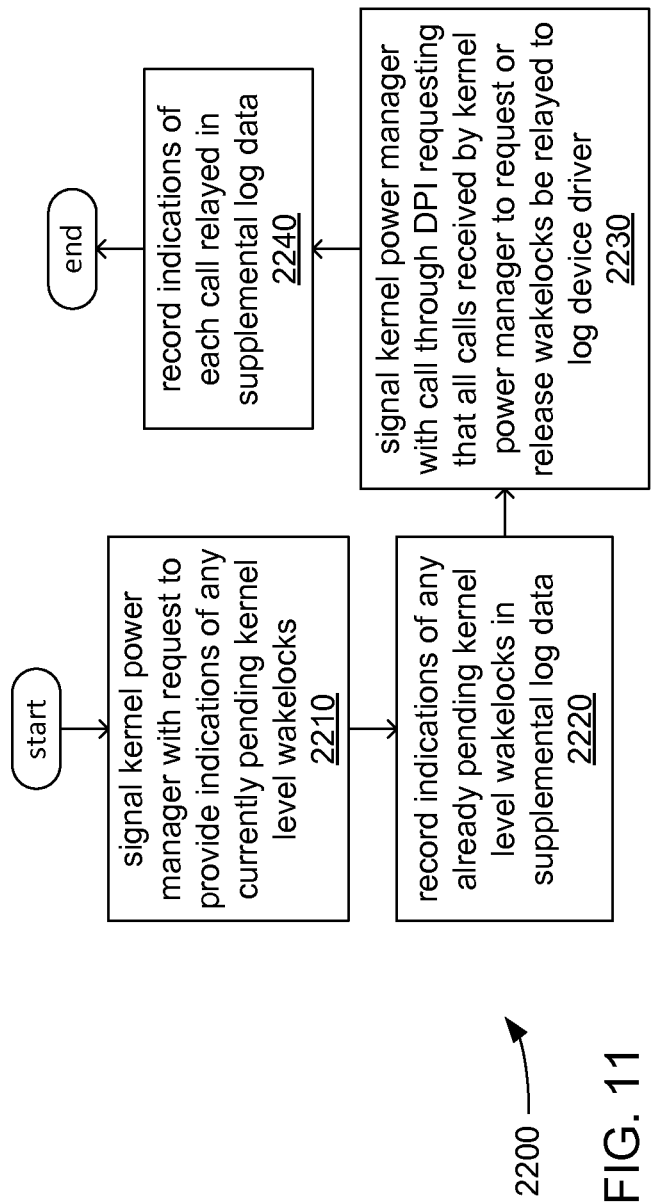

FIG. 11 illustrates one embodiment of a logic flow 2200. The logic flow 2200 may be representative of some or all of the operations executed by one or more embodiments described herein. More specifically, the logic flow 2200 may illustrate operations performed by the processor component 350 in executing at least the control routine 340 and the log device driver 171, and/or performed by other component(s) of the computing device 300.

At 2210, a processor component of a computing device of a wakelock debugging system (e.g., the processor component 350 of the computing device 300 of the wakelock debugging system 1000) executes a log device driver coupled to a kernel power manager (e.g., the log device driver 171 in communication with the kernel power manager 341 of the operating system 340). In so doing, the processor component signals the kernel power manager with a request to provide indications of any kernel level wakelocks already pending at the time that the functionality of the log device driver is enabled. As has been discussed, this may entail the kernel power manager accessing a data structure maintained by the operating system (e.g., the wakelock data maintained as part of the system data 330) to retrieve entries of the data structure that correlate pending wakelocks to identifiers of whatever device drivers or operating system component are associated with them as a result of requesting them. Such entries of such a data structure may also maintain indications of which of those wakelocks are pending, or may include only entries for wakelocks that are pending. At 2220, indications of any kernel wakelocks already pending at the time the log device driver is enabled are recorded in a supplemental log data generated by the log device driver.

At 2230, the processor component is caused by the log device driver to signal the kernel power manager with a call through a driver programming interface (DPI) requesting that all calls received by the kernel power manager to request or release kernel level wakelocks be relayed to the log device driver. As previously discussed, such a call to the kernel power manager may be a call to invoke a callback mechanism provided by the DPI by which calls regarding wakelocks are reflected back to one or more device drivers. At 2240, the log device driver creates entries in the supplemental log data for each of the calls to request and release kernel wakelocks that are reflected back to the log device driver by the kernel power manager. Again, this reflecting back of calls may be in response to the earlier call to invoke the callback mechanism.

Figure 12:
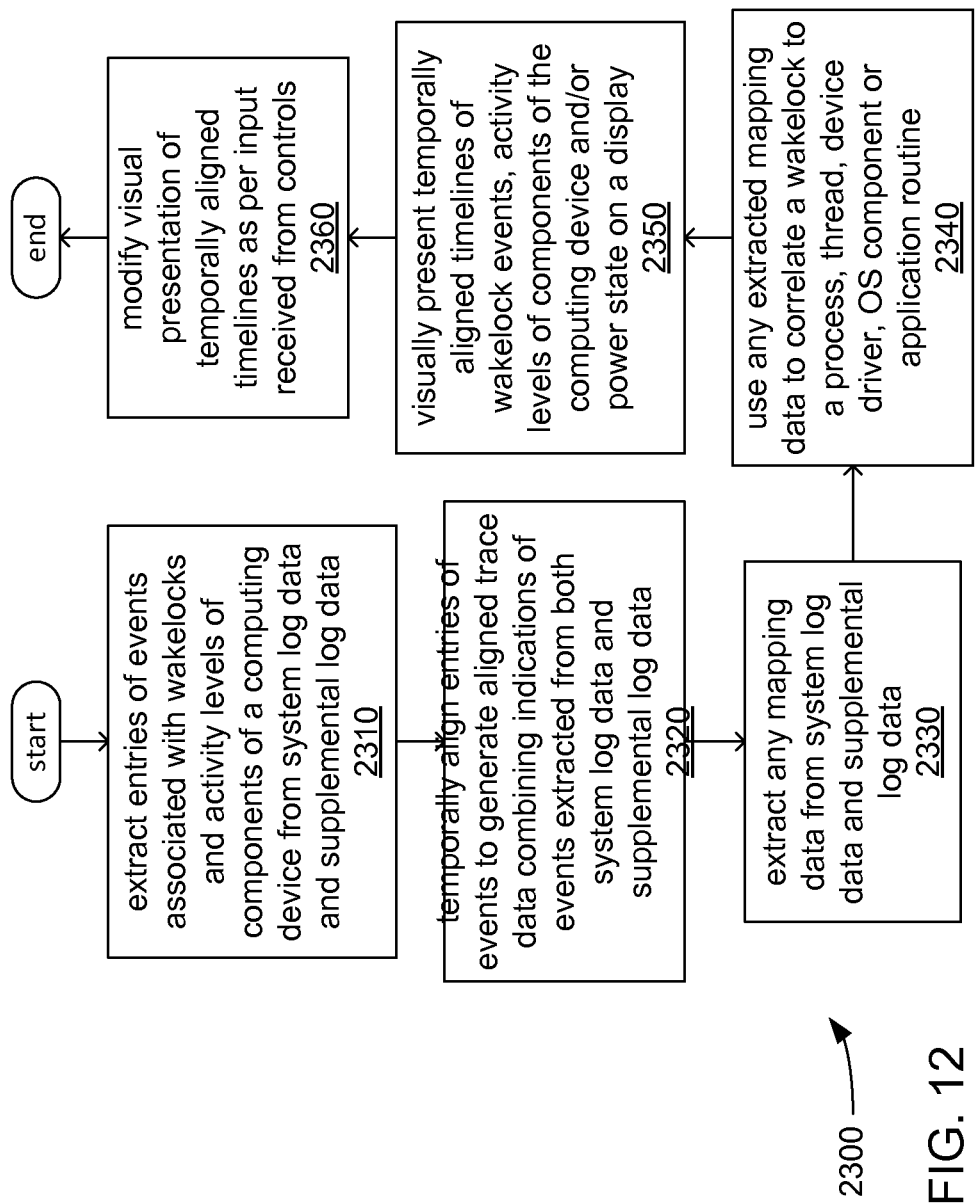

FIG. 12 illustrates one embodiment of a logic flow 2300. The logic flow 2300 may be representative of some or all of the operations executed by one or more embodiments described herein. More specifically, the logic flow 2300 may illustrate operations performed by the processor component 350 or 550 in executing at least the debugging routine 570, and/or performed by other component(s) of the computing device 300 or the debugging device 500, respectively.

At 2310, a processor component of a computing device or a debugging device (e.g., the processor component 350 or 550 of the computing device 300 or the debugging device 500 of the wakelock debugging system 1000) extracts entries associated with wakelocks and activity levels of components of the computing device from system log data and supplemental log data generated during operation of the computing device. As has been discussed, the extracted entries may include indications of calls to request and/or release wakelocks, indications of levels of activity of one or more components of the computing device, indications of transitions between power states of the computing device, etc. At 2320, the extracted entries are temporally aligned to generate an aligned trace data (e.g., the aligned trace data 534 generated from entries extracted from the system log data 337 and the supplemental log data 331).

At 2330, any mapping data included in one or the other of the system log data and the supplemental log data is also extracted. At 2340, such extracted mapping data is employed to correlate identifying information from the extracted entries to correlate a wakelock to a process, a thread a device driver, a component of the operating system of the computing device or an application routine.

At 2350, the entries of the aligned trace data are used to generate timelines of wakelock events, changes in activity levels of components, changes in power state of the computing device, etc. Further, these timelines are then visually presented on a display in a manner in which they are temporally aligned to a common period of time in the operation of the computing device. At 2360, controls may be monitored to receive indications of operation of those controls to convey commands to select which timelines to display and/or to select what portion of the time covered by the entries of the aligned trace data to display, and the visual presentation of the temporally aligned timelines is altered accordingly.

Figure 13:
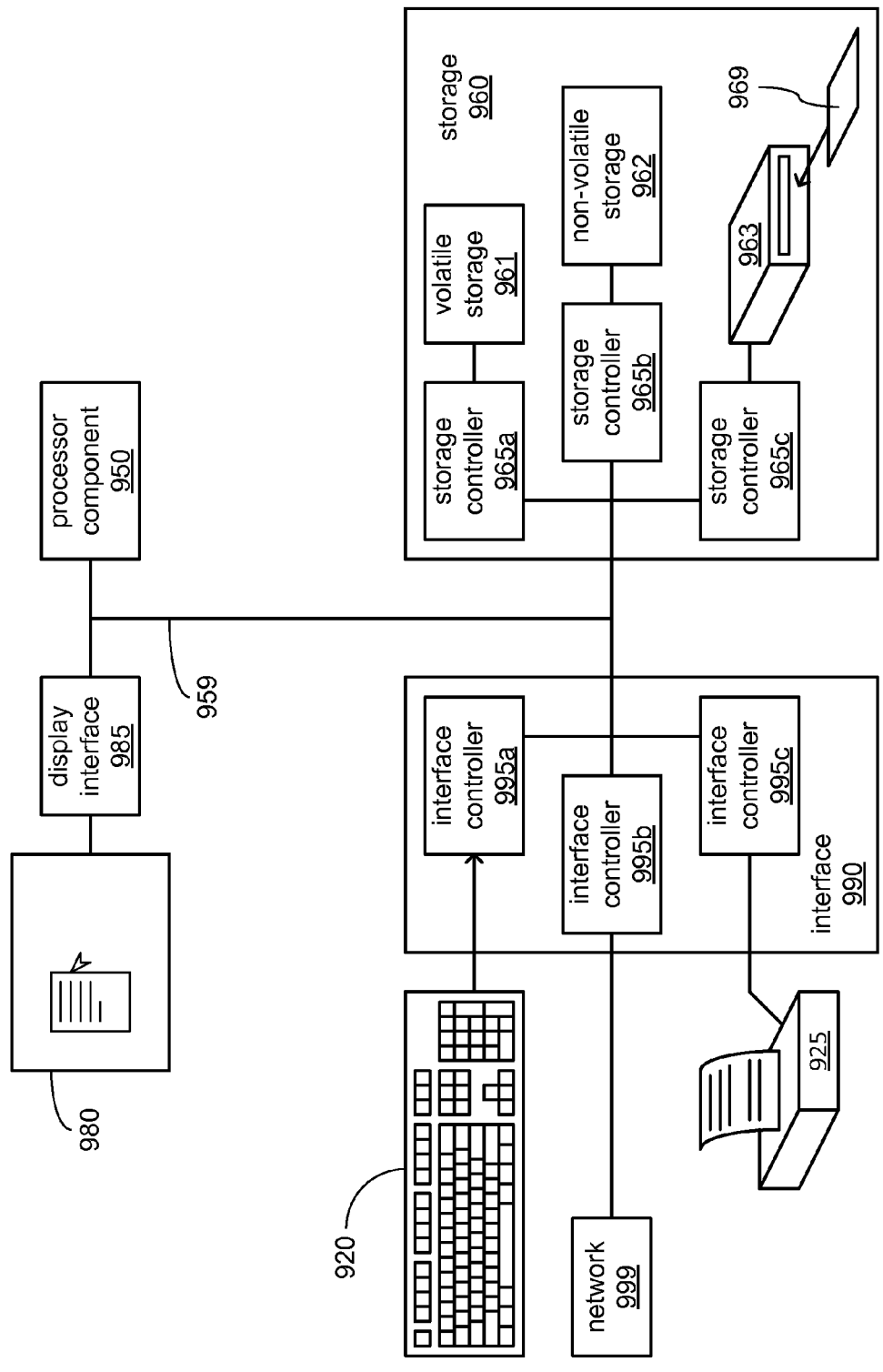
FIG. 13 illustrates a processing architecture according to an embodiment.

FIG. 13 illustrates an embodiment of a processing architecture 3000 suitable for implementing various embodiments as previously described. More specifically, the processing architecture 3000 (or variants thereof) may be implemented as part of one or more of the computing devices 100, 300 or 500. It should be noted that components of the processing architecture 3000 are given reference numbers in which the last two digits correspond to the last two digits of reference numbers of at least some of the components earlier depicted and described as part of these computing devices. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to one or more other devices, and a coupling 959. As will be explained, depending on various aspects of a computing device implementing the processing architecture 3000, including its intended use and/or conditions of use, such a computing device may further include additional components, such as without limitation, a display interface 985, or one or more processing subsystems 900. In whatever computing device may implement the processing architecture 3000, one of the various depicted components that are implemented with circuitry may be implemented with discrete components and/or as blocks of circuitry within a single or relatively small number of semiconductor devices (e.g., a "system on a chip" or SOC).

The coupling 959 may include one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 350 or 550) may include any of a wide variety of commercially available processors, employing any of a wide variety of technologies and implemented with one or more cores physically combined in any of a number of ways.

As previously discussed, the storage 960 (corresponding to one or more of the storages 360 or 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to one or more of the interfaces 390 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 580), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In some examples, an apparatus to trace wakelock events may include a processor component; a capture component for execution by the processor component to intercept calls associated with application level wakelocks, the intercepted calls received by an application power manager of an operating system from application routines; and a relaying component for execution by the processor component to cooperate with the application power manager to provide indications of the intercepted calls to a system log generator of the operating system coupled to the application power manager, the system log generator to generate system log data comprising indications of events associated with execution of the operating system by the processor component and the indications of the intercepted calls.

Additionally or alternatively, the apparatus may include a collection component for execution by the processor component to cooperate with the application power manager to collect wakelock data that provides indications of pending application level wakelocks and correlates the pending application level wakelocks to the application routines.

Additionally or alternatively, the relaying component may cooperate with the application power manager to provide indications of the pending application level wakelocks to the system log generator, the system log generator to include the indications of the pending application level wakelocks in the system log data.

Additionally or alternatively, the apparatus may include a collection component for execution by the processor component to cooperate with the application power manager to collect mapping data that correlates the application routines to processes executed by the processor component or to threads on which portions of the application routines are executed.

Additionally or alternatively, the relaying component may cooperate with the application power manager to provide the mapping data to the system log generator, the system log generator to include the mapping data in the system log data.

Additionally or alternatively, the intercepted calls may include a call to request a wakelock or a call to release a pending wakelock.

Additionally or alternatively, the apparatus may include the application power manager, the application power manager augmented to comprise the capture component and the relaying component.

Additionally or alternatively, the apparatus may include a call component of a log device driver for execution by the processor component to signal a kernel power manager of the operating system to relay calls associated with kernel level wakelocks to the log device driver, the relayed calls received by the kernel power manager from device drivers or components of the operating system.

Additionally or alternatively, the components of the operating system may include the application power manager, the application power manager coupled to the kernel power manager to signal the kernel power manager with a call associated with a kernel level wakelock.

Additionally or alternatively, the apparatus may include a reception component for execution by the processor component to receive the relayed calls at the log device driver, and a logging component for execution by the processor component to generate supplemental log data comprising indications of the relayed calls.

Additionally or alternatively, the apparatus may include a correlating component to extract entries associated with the application level wakelocks from the system log data, to extract entries associated with the kernel level wakelocks from the supplemental log data, to extract entries indicating activity levels of components of a computing device comprising the processor component from the system log data, and to temporally align the extracted entries; and a presentation component to generate and visually present temporally aligned timeline graphs of events associated with the application level wakelocks and the kernel level wakelocks, and of the activity levels of the components of the computing device on a display, the events and activity levels indicated in the extracted entries.

Additionally or alternatively, the apparatus may include an interface to transmit the system log data and the supplemental log data to a debugging device.

In some examples, an apparatus to trace wakelock events may include a processor component; a correlating component to extract from system log data indications of calls associated with application level wakelocks directed to an application power manager of an operating system, to extract from supplemental log data indications of calls associated with kernel level wakelocks directed to a kernel power manager of the operating system, and to extract from the system log data indications of activity levels of components of a computing device on which the operating system is executed; and a presentation component to generate and visually present temporally aligned timeline graphs of the calls associated with the application level wakelocks, the calls associated with the kernel level wakelocks, and changes in the activity levels of the components of the computing device on a display.

Additionally or alternatively, the correlating component may extract mapping information from one of the system log data and the supplemental log data, the mapping information comprising an indication of a correlation of an application routine executed on the computing device to one of a process executed on the computing device and a thread of execution of the computing device.

Additionally or alternatively, the correlating component may employ the indication of correlation to correlate at least two indications of calls associated with application level wakelocks.

Additionally or alternatively, the apparatus may include controls, and the presentation component may monitor the controls to receive an indication of operation of the controls conveying a command to select a period of time to which the timeline graphs are temporally aligned.

In some examples, a computer-implemented method for assigning processor component cores to perform task portions may include intercepting calls associated with application level wakelocks, the intercepted calls received by an application power manager of an operating system from application routines; and cooperating with the application power manager to provide indications of the intercepted calls to a system log generator of the operating system coupled to the application power manager, the system log generator to generate system log data comprising indications of events associated with execution of the operating system and the indications of the intercepted calls.

Additionally or alternatively, the method may include cooperating with the application power manager to collect wakelock data that provides indications of pending application level wakelocks and correlates the pending application level wakelocks to the application routines.

Additionally or alternatively, the method may include cooperating with the application power manager to provide indications of the pending application level wakelocks to the system log generator, the system log generator to include the indications of the pending application level wakelocks in the system log data.

Additionally or alternatively, the method may include cooperating with the application power manager to collect mapping data correlating the application routines to processes executed by the processor component or to threads on which portions of the application routines are executed.

Additionally or alternatively, the method may include cooperating with the application power manager to provide the mapping data to the system log generator, the system log generator to include the mapping data in the system log data.

Additionally or alternatively, the intercepted calls may include a call to request a wakelock or a call to release a pending wakelock.

Additionally or alternatively, the method may include signaling a kernel power manager of the operating system to relay calls associated with kernel level wakelocks to a log device driver, the relayed calls received by the kernel power manager from device drivers or components of the operating system.

Additionally or alternatively, the components of the operating system may include the application power manager, the application power manager coupled to the kernel power manager to signal the kernel power manager with a call associated with a kernel level wakelock.

Additionally or alternatively, the method may include receiving the relayed calls at the log device driver, and generating supplemental log data comprising indications of the relayed calls.

Additionally or alternatively, the method may include extracting entries associated with the application level wakelocks from the system log data, extracting entries associated with the kernel level wakelocks from the supplemental log data, extracting entries indicating activity levels of components of a computing device comprising the processor component from the system log data; temporally aligning the extracted entries, and visually presenting on a display temporally aligned timeline graphs of events associated with the application level wakelocks and the kernel level wakelocks, and of the activity levels of the components of the computing device, the events and activity levels indicated in the extracted entries.

Additionally or alternatively, the method may include transmitting the system log data and the supplemental log data to a debugging device via a network.

In some examples, at least one machine-readable storage medium may include instructions that when executed by a processor component, cause the processor component to intercept calls associated with application level wakelocks, the intercepted calls received by an application power manager of an operating system of the computing device from application routines; and cooperate with the application power manager to provide indications of the intercepted calls to a system log generator of the operating system coupled to the application power manager, the system log generator to generate system log data comprising indications of events associated with execution of the operating system and the indications of the intercepted calls.

Additionally or alternatively, the processor component may be caused to cooperate with the application power manager to collect wakelock data that provides indications of pending application level wakelocks and correlates the pending application level wakelocks to the application routines, and cooperate with the application power manager to provide indications of the pending application level wakelocks to the system log generator, the system log generator to include the indications of the pending application level wakelocks in the system log data.

Additionally or alternatively, the processor component may be caused to cooperate with the application power manager to collect mapping data correlating the application routines to processes executed by the processor component or to threads on which portions of the application routines are executed, and cooperate with the application power manager to provide the mapping data to the system log generator, the system log generator to include the mapping data in the system log data.

Additionally or alternatively, the intercepted calls may include a call to request a wakelock or a call to release a pending wakelock.

Additionally or alternatively, the processor component may be caused to signal a kernel power manager of the operating system to relay calls associated with kernel level wakelocks to a log device driver, the relayed calls received by the kernel power manager from device drivers or components of the operating system.

Additionally or alternatively, the components of the operating system may include the application power manager, the application power manager coupled to the kernel power manager to signal the kernel power manager with a call associated with a kernel level wakelock.

Additionally or alternatively, the processor component may be caused to receive the relayed calls at the log device driver, and generate supplemental log data comprising indications of the relayed calls.

Additionally or alternatively, the processor component may be caused to extract entries associated with the application level wakelocks from the system log data; extract entries associated with the kernel level wakelocks from the supplemental log data; extract entries indicating activity levels of components of a computing device comprising the processor component from the system log data; temporally align the extracted entries; and visually present on a display temporally aligned timeline graphs of events associated with the application level wakelocks and the kernel level wakelocks, and of the activity levels of the components of the computing device, the events and activity levels indicated in the extracted entries.

Additionally or alternatively, the processor component may be caused to transmit the system log data and the supplemental log data to a debugging device via a network.

In some examples, at least one machine-readable storage medium may include instructions that when executed by a computing device, cause the computing device to perform any of the above.

In some examples, an apparatus to assign processor component cores to perform task portions may include means for performing any of the above.

The invention claimed is:

1. An apparatus to trace wakelock events comprising:
a processor component;
logic, at least a portion of which is implemented in hardware, the logic to:
   intercept calls associated with application level wakelocks, the intercepted calls to be received by an application power manager of an operating system;
   provide indications of the intercepted calls to a system log generator of the operating system coupled to the application power manager, the system log generator to generate system log data comprising indications of events associated with execution of the operating system by the processor component and the indications of the intercepted calls;
   collect wakelock data that provides indications of pending application level wakelocks;
   correlate the pending application level wakelocks to a one of the events; and
   signal a kernel power manager of the operating system, the signal to include an indication to prevent the operating system from transitioning to a lower power state based on correlating the pending application level wakelocks.

2. The apparatus of claim 1, the logic to comprise the application power manager.

3. The apparatus of claim 1, the signal to include an indication to relay calls associated with kernel level wakelocks to a log device driver, the relayed calls received by the kernel power manager from device drivers or components of the operating system.

4. The apparatus of claim 3, the logic to:
receive the relayed calls at the log device driver; and
generate supplemental log data comprising indications of the relayed calls.

5. The apparatus of claim 4, comprising an interface to transmit the system log data and the supplemental log data to a debugging device.

6. A computing-implemented method for tracing wakelock events comprising:
intercepting calls associated with application level wakelocks, the intercepted calls received by an application power manager of an operating system from application routines;
providing indications of the intercepted calls to a system log generator of the operating system coupled to the application power manager, the system log generator to generate system log data comprising indications of events associated with execution of the operating system and the indications of the intercepted calls;

collect wakelock data that provides indications of pending application level wakelocks;

correlating the pending application level wakelocks to a one of the events; and signaling a kernel power manager of the operating system, the signal to include an indication to prevent the operating system from transitioning to a lower power state based on correlating the pending application level wakelocks.

7. The computer-implemented method of claim 6, comprising cooperating with the application power manager to collect mapping data correlating the application routines to processes executed by processor component or to threads on which portions of the application routines are executed.

8. The computer-implemented method of claim 6, the intercepted calls comprising a call to request a wakelock or a call to release a pending wakelock.

9. The computer-implemented method of claim 6, the signal to include an indication to relay calls associated with kernel level wakelocks to a log device driver, the relayed calls received by the kernel power manager from device drivers or components of the operating system.

10. The computer-implemented method of claim 9, comprising:

receiving the relayed calls at the log device driver; and generating supplemental log data comprising indications of the relayed calls.

11. The computer-implemented method of claim 10, comprising:

extracting entries associated with the application level wakelocks from the system log data;

extracting entries associated with the kernel level wakelocks from the supplemental log data;

extracting entries indicating activity levels of components of a computing device comprising processor component from the system log data;

temporally aligning the extracted entries; and visually presenting on a display temporally aligned timeline graphs of events associated with the application level wakelocks and the kernel level wakelocks, and of the activity levels of the components of the computing device, the events and activity levels indicated in the extracted entries.

12. At least one non-transitory machine-readable storage medium comprising instructions that when executed by a processor component, cause the processor component to:

intercept calls associated with application level wakelocks, the intercepted calls received by an application power manager of an operating system of the computing device from application routines;

cooperate with the application power manager to provide indications of the intercepted calls to a system log generator of the operating system coupled to the application power manager, the system log generator to generate system log data comprising indications of events associated with execution of the operating system and the indications of the intercepted calls;

collect wakelock data that provides indications of pending application level wakelocks;

correlating the pending application level wakelocks to a one of the events; and signaling a kernel power manager of the operating system, the signal to include an indication to prevent the operating system from transitioning to a lower power state based on correlating the pending application level wakelocks.

13. The at least one machine-readable storage medium of claim 12, the processor component caused to:

cooperate with the application power manager to collect mapping data correlating the application routines to processes executed by the processor component or to threads on which portions of the application routines are executed; and cooperate with the application power manager to provide the mapping data to the system log generator, the system log generator to include the mapping data in the system log data.

14. The at least one machine-readable storage medium of claim 12, the intercepted calls comprising a call to request a wakelock or a call to release a pending wakelock.

15. The at least one machine-readable storage medium of claim 12, the signal to include an indication to relay calls associated with kernel level wakelocks to a log device driver, the relayed calls received by the kernel power manager from device drivers or components of the operating system.

16. The at least one machine-readable storage medium of claim 15, the components of the operating system comprising the application power manager, the application power manager coupled to the kernel power manager to signal the kernel power manager with a call associated with a kernel level wakelock.

* * * * *